United States Patent
Darsow et al.

(10) Patent No.: US 8,271,923 B2
(45) Date of Patent: *Sep. 18, 2012

(54) IMPLEMENTING FORWARD TRACING TO REDUCE PESSIMISM IN STATIC TIMING OF LOGIC BLOCKS LAID OUT IN PARALLEL STRUCTURES ON AN INTEGRATED CIRCUIT CHIP

(75) Inventors: Craig M. Darsow, Rochester, MN (US); Timothy D. Helvey, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 147 days.

This patent is subject to a terminal disclaimer.

(21) Appl. No.: 12/841,403

(22) Filed: Jul. 22, 2010

(65) Prior Publication Data

US 2012/0023466 A1 Jan. 26, 2012

(51) Int. Cl.
G06F 17/50 (2006.01)

(52) U.S. Cl. ........ 716/113; 716/108; 716/134; 716/136; 703/16

(58) Field of Classification Search ................... 716/113, 716/108, 134, 136; 703/16
See application file for complete search history.

(56) References Cited

U.S. PATENT DOCUMENTS

| | | | |
|---|---|---|---|
| 5,636,372 A | 6/1997 | Hathaway et al. | |
| 5,812,835 A | 9/1998 | Ruuskanen | |
| 6,237,127 B1 | 5/2001 | Craven et al. | |
| 6,795,951 B2* | 9/2004 | Hathaway et al. | 716/108 |
| 7,096,442 B2 | 8/2006 | Lu et al. | |
| 7,117,466 B2* | 10/2006 | Kalafala et al. | 716/108 |
| 7,143,379 B2* | 11/2006 | Darsow et al. | 716/108 |
| 7,181,711 B2* | 2/2007 | Foreman et al. | 716/113 |
| 7,237,212 B2 | 6/2007 | Kucukcakar et al. | |
| 7,243,323 B2 | 7/2007 | Williams et al. | |
| 7,269,812 B2* | 9/2007 | Darsow et al. | 716/108 |
| 7,398,491 B2* | 7/2008 | Schaeffer et al. | 716/113 |
| 7,406,669 B2 | 7/2008 | Lindberg | |
| 7,546,500 B2* | 6/2009 | Kapur et al. | 714/726 |
| 7,636,905 B2* | 12/2009 | Darsow et al. | 716/113 |
| 7,694,254 B2* | 4/2010 | Gregerson et al. | 716/113 |
| 7,765,503 B2* | 7/2010 | Smith | 716/113 |
| 7,784,003 B2* | 8/2010 | Buck et al. | 716/113 |
| 7,797,601 B2* | 9/2010 | Kapur et al. | 714/726 |
| 7,886,247 B2* | 2/2011 | Fatemi et al. | 716/136 |
| 7,926,019 B1* | 4/2011 | Ravi | 716/134 |
| 8,060,770 B2 | 11/2011 | Kuzmin et al. | |
| 8,099,702 B2 | 1/2012 | Hou et al. | |
| 8,103,997 B2* | 1/2012 | Sinha et al. | 716/100 |
| 8,108,816 B2* | 1/2012 | Foreman et al. | 716/108 |

(Continued)

OTHER PUBLICATIONS

U.S. Appl. No. 12/841,384 entitled "Implementing Timing Pessimism Reduction for Parallel Clock Trees," filed Jul. 22, 2010, by Craig M. Darsow et al.

(Continued)

*Primary Examiner* — Phallaka Kik
(74) *Attorney, Agent, or Firm* — Joan Pennington

(57) ABSTRACT

A method, system and computer program product are provided for implementing forward tracing to reduce pessimism in static timing of logic blocks laid out in parallel structures on an integrated circuit chip. A common path pessimism removal algorithm is enhanced by a forward tracing parallel clock tree proximity credit algorithm that uses forward tracing, and computes a proximity credit that is applied to reduce pessimism in the static timing.

20 Claims, 6 Drawing Sheets

U.S. PATENT DOCUMENTS

| | | | |
|---|---|---|---|
| 8,122,404 B2 * | 2/2012 | Sinha et al. | 716/108 |
| 8,122,411 B2 * | 2/2012 | Abbaspour et al. | 716/113 |
| 8,141,014 B2 * | 3/2012 | Foreman et al. | 716/108 |
| 2005/0066297 A1 * | 3/2005 | Kalafala et al. | 716/6 |
| 2005/0183051 A1 * | 8/2005 | Darsow et al. | 716/6 |
| 2006/0248485 A1 * | 11/2006 | Foreman et al. | 716/6 |
| 2007/0022397 A1 * | 1/2007 | Darsow et al. | 716/6 |
| 2007/0277131 A1 * | 11/2007 | Schaeffer et al. | 716/4 |
| 2008/0163147 A1 * | 7/2008 | Gregerson et al. | 716/6 |
| 2008/0209372 A1 * | 8/2008 | Buck et al. | 716/6 |
| 2009/0222780 A1 * | 9/2009 | Smith | 716/6 |
| 2009/0271751 A1 * | 10/2009 | Fatemi et al. | 716/6 |
| 2010/0083205 A1 | 4/2010 | Ono | |
| 2010/0269083 A1 * | 10/2010 | Sinha et al. | 716/11 |
| 2010/0318951 A1 * | 12/2010 | Foreman et al. | 716/108 |
| 2011/0016442 A1 * | 1/2011 | Abbaspour et al. | 716/108 |
| 2011/0035714 A1 * | 2/2011 | Foreman et al. | 716/108 |
| 2011/0239173 A1 * | 9/2011 | Ravi | 716/108 |
| 2012/0023466 A1 | 1/2012 | Darsow et al. | |
| 2012/0023469 A1 * | 1/2012 | Darsow et al. | 716/113 |

OTHER PUBLICATIONS

Zejda et al.; "General Framework for Removal of Clock Network Pessimism"; IEEE/ACM International Conference: year 2002; pp. 632-639.

* cited by examiner

_US 8,271,923 B2_

IMPLEMENTING FORWARD TRACING TO REDUCE PESSIMISM IN STATIC TIMING OF LOGIC BLOCKS LAID OUT IN PARALLEL STRUCTURES ON AN INTEGRATED CIRCUIT CHIP

FIELD OF THE INVENTION

The present invention relates generally to the field of static timing analysis of integrated circuit design, and more particularly, relates to a method, system and computer program product for implementing forward tracing to reduce pessimism in static timing of logic blocks laid out in parallel structures on an integrated circuit chip.

DESCRIPTION OF THE RELATED ART

A static timing tool typically is used to automatically analyze the timing of an integrated circuit design to ensure that circuits meet critical timing constraints. EinsTimer, a commercially available static timing tool by International Business Machines Corporation, of Armonk, N.Y., performs static timing analysis on an integrated circuit design.

In some Application Specific Integrated Circuit (ASIC) designs, clock trees are built such that synchronous clocks have parallel clock trees. This might happen if a divided clock is used. For example, some latches in the design may be clocked at 500 MHz and some at 250 MHz with the 250 MHz clock being created from the 500 MHz using a clock divider at the base of the trees.

When using this sort of parallel clock tree structure, logic paths that cross from one of the clock trees to the other clock tree can suffer from significant variation penalties due to the large number of clock gates that are not common between the latches involved. Timing pessimism results when considering delay variation along common segments of clock paths.

If these parallel clock trees are built with similar layouts using gates at each level of the tree that are placed near each other, then it is known that some of the variation penalty can be reduced. This reduction comes from the fact that gates far away from each other on a chip die typically have more process variation than gates that are near each other.

Tools exist, such as EinsTimer, to reduce timing pessimism by taking advantage of this reduction in variation due to proximity. However, these tools require all gates, which are not common between source and sink latch to be inside a bounding box. In conventional topology, individual pairs of gates would fit inside a bounding box, but the complete topology does not fit inside the bounding box.

A need exists for an efficient and effective mechanism to reduce pessimism in static timing of logic blocks laid out in parallel structures on an integrated circuit chip in small parallel structures widely separated from other small structures involved in timing of a set of gates.

SUMMARY OF THE INVENTION

A principal aspect of the present invention is to provide a method, system and computer program product for implementing forward tracing to reduce pessimism in static timing of logic blocks laid out in parallel structures on an integrated circuit chip. Other important aspects of the present invention are to provide such method, system, and computer program product substantially without negative effect and that overcome many of the disadvantages of prior art arrangements.

In brief, a method, system and computer program product are provided for implementing forward tracing to reduce pessimism in static timing of logic blocks laid out in parallel structures on an integrated circuit chip. A common path pessimism removal algorithm is enhanced by a forward tracing parallel clock tree proximity credit algorithm that uses forward tracing, and computes a proximity credit that is applied to reduce pessimism in the static timing.

An initial analysis is made to provide data for a table of proximity-related pessimism values (PPVs) at each potentially pessimism-introducing block and the amount of potential pessimism at each potentially pessimism-introducing block is associated by the table with a label for that potentially pessimism-introducing block. When full timing analysis is carried out, analysis of the labels on a pair of signals involved in a test allows identification of which potentially pessimism-introducing points affect the particular test. Reference to the pessimism values table using the labels identifies the quantity of pessimism that can be reasonably removed from the test for each potentially pessimism-introducing point affecting the test. The sum of the proximity-related pessimism values (PPVs) is the amount of a proximity credit (PC) appropriate to improve the timing slack on the test.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method is provided to reduce pessimism in static timing of logic blocks laid out in parallel structures on an integrated circuit chip. A forward tracing parallel clock tree proximity credit algorithm is provided to enhance a common path pessimism removal algorithm using forward tracing to compute a proximity credit that reduce pessimism in the static timing.

Figure 1:
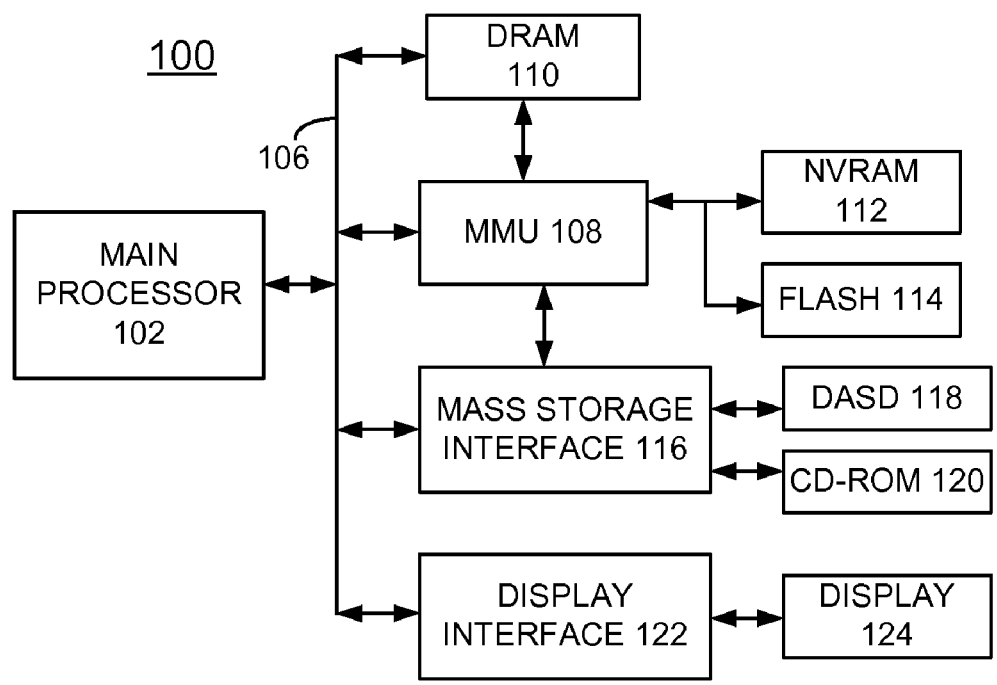
FIGS. 1 and 2 are block diagram representations illustrating an example computer system and operating system for implementing forward tracing to reduce pessimism in static timing of logic blocks laid out in parallel structures on an integrated circuit chip in accordance with the preferred embodiment.
Figure 2:
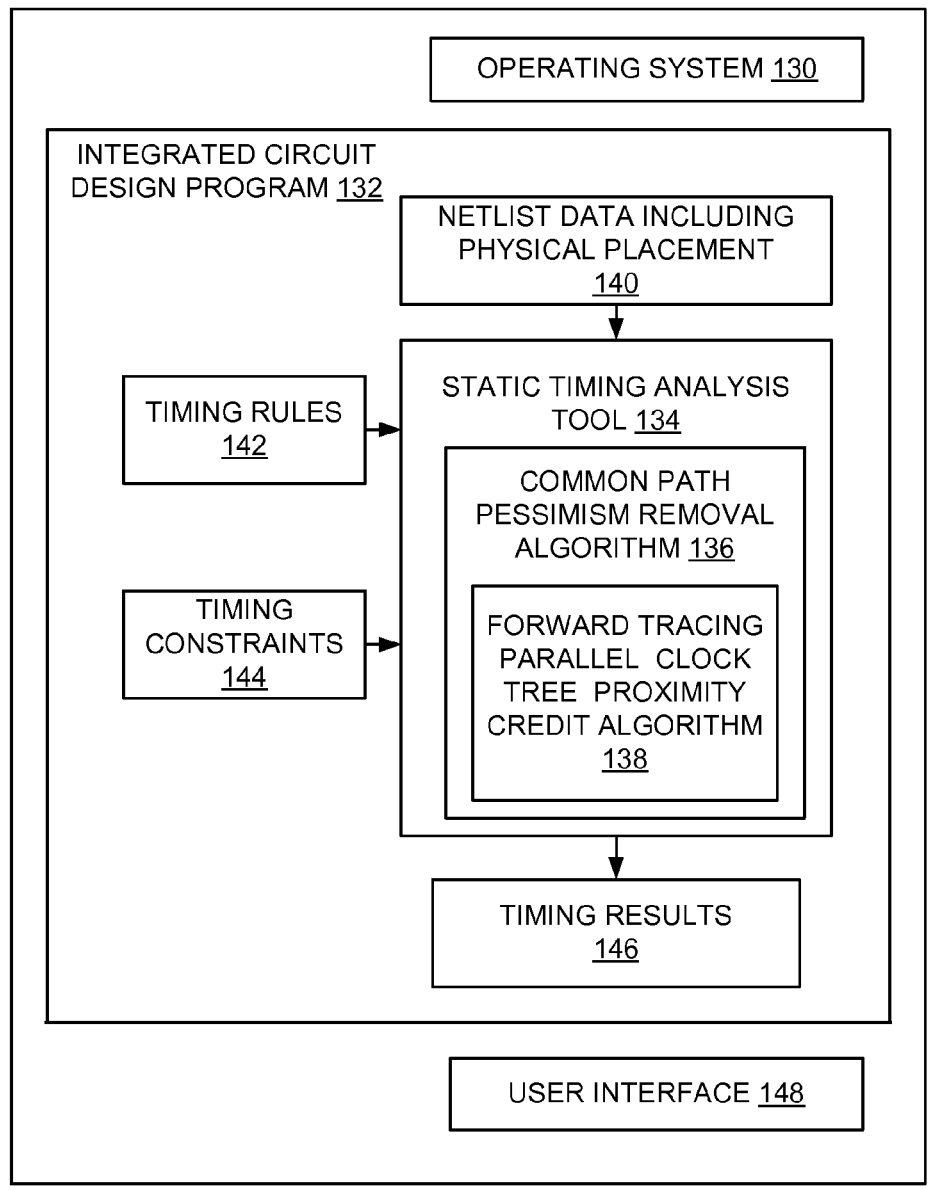

Referring now to the drawings, in FIGS. 1 and 2 there is shown a computer system generally designated by the reference character 100 for implementing forward tracing to reduce pessimism in static timing of logic blocks laid out in parallel structures on an integrated circuit chip in accordance with the preferred embodiment. Computer system 100 includes a main processor 102 or central processor unit (CPU) 102 coupled by a system bus 106 to a memory management unit (MMU) 108 and system memory including a dynamic random access memory (DRAM) 110, a nonvolatile random access memory (NVRAM) 112, and a flash memory 114. A mass storage interface 116 coupled to the system bus 106 and MMU 108 connects a direct access storage device (DASD) 118 and a CD-ROM drive 120 to the main processor 102. Computer system 100 includes a display interface 122 coupled to the system bus 106 and connected to a display 124.

Computer system 100 is shown in simplified form sufficient for understanding the present invention. The illustrated computer system 100 is not intended to imply architectural or functional limitations. The present invention can be used with various hardware implementations and systems and various other internal hardware devices, for example, multiple main processors.

As shown in FIG. 2, computer system 100 includes an operating system 130, an integrated circuit design program 132, a static timing analysis tool 134, a common path pessimism removal algorithm or program 136, a forward tracing parallel clock tree proximity credit algorithm or program 138 of the preferred embodiment, timing rules 142, timing constraints 144, timing results 146, and a user interface 148.

Figure 4A:
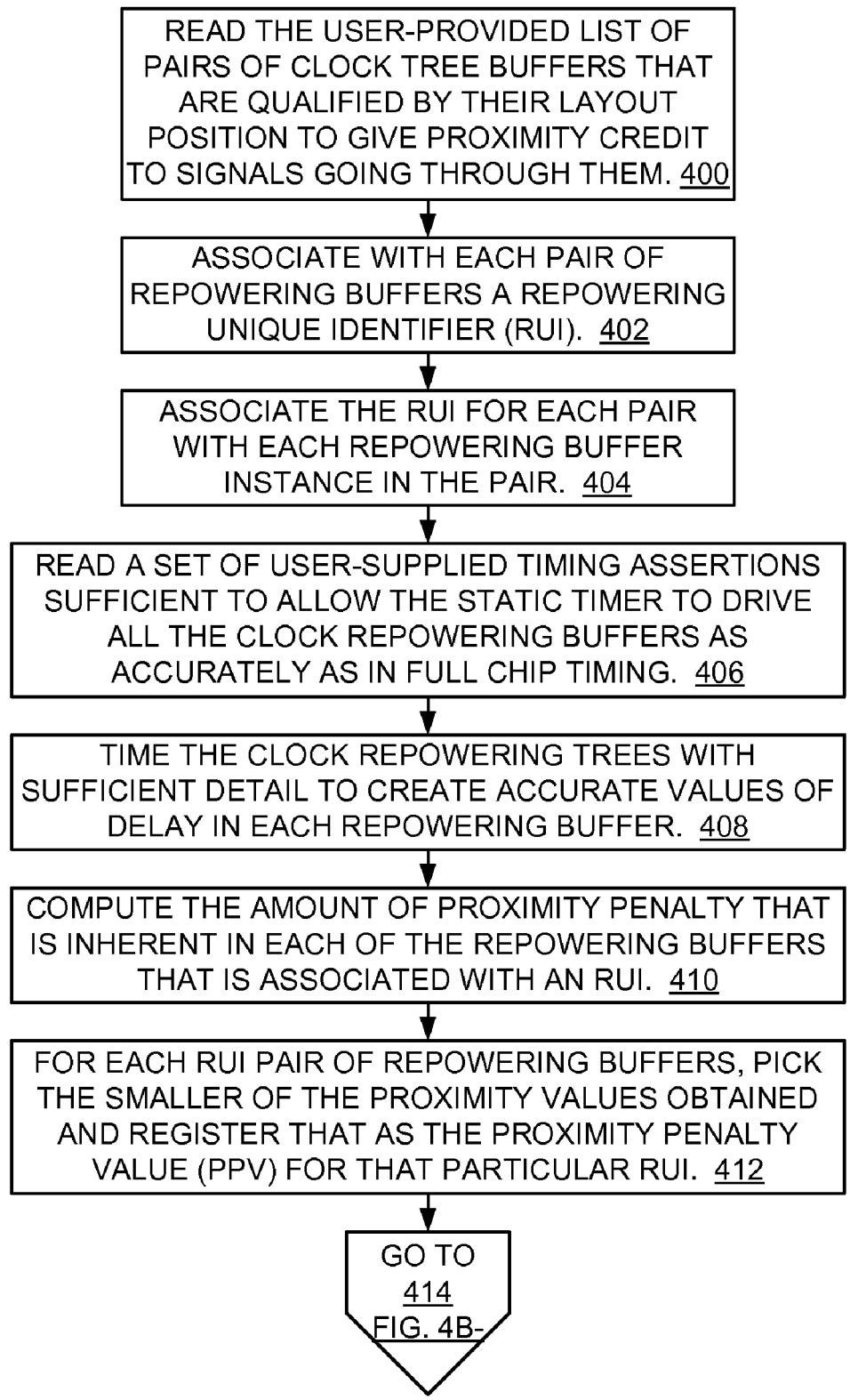
FIGS. 4A and 4B are a flow chart illustrating exemplary sequential steps for implementing forward tracing to reduce pessimism in static timing of logic blocks laid out in parallel structures on an integrated circuit chip in accordance with the preferred embodiment.

Various commercially available computers can be used for computer system 100. CPU 102 is suitably programmed by the forward tracing parallel clock tree proximity credit algorithm or program 138 to execute the flowchart of FIGS. 4A and 4B for implementing forward tracing to reduce pessimism in static timing of logic blocks laid out in parallel structures on an integrated circuit chip in accordance with the preferred embodiment.

Figure 3:
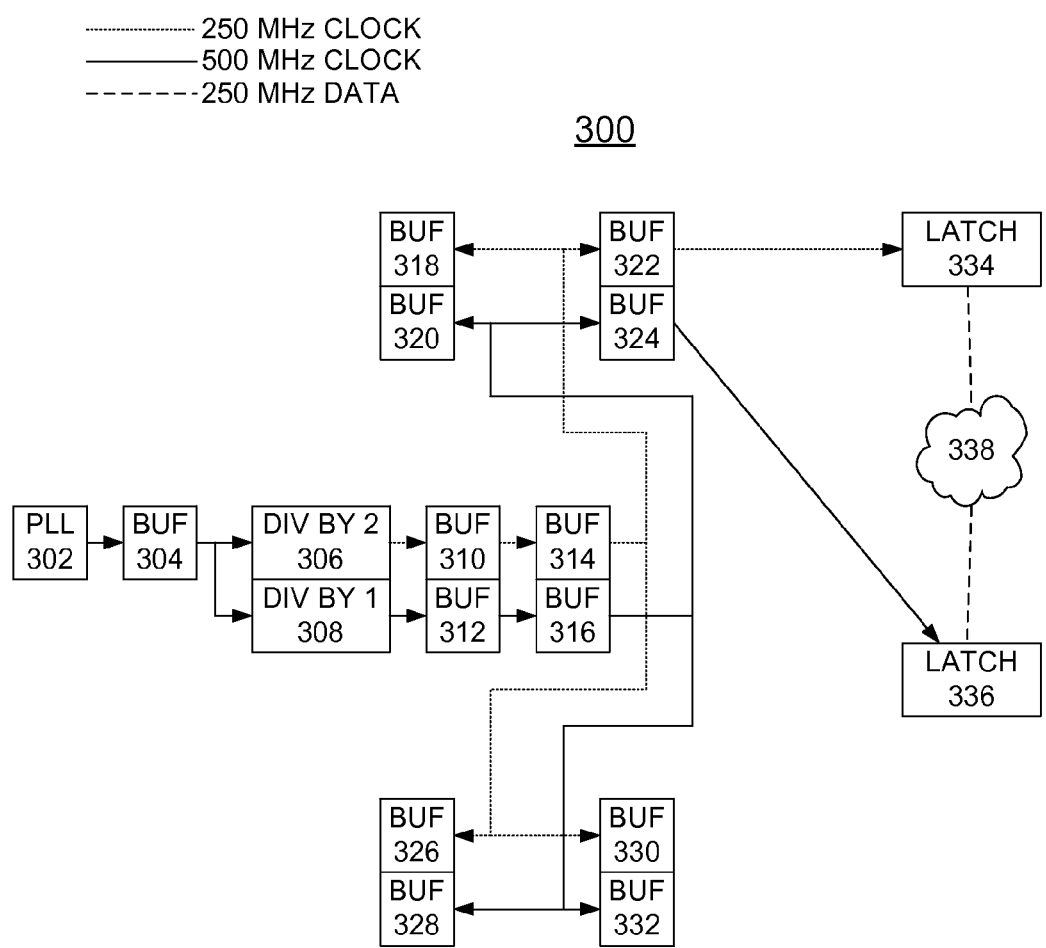
FIG. 3 is an example integrated circuit of a type to be used for implementing forward tracing to reduce pessimism in static timing of logic blocks laid out in parallel structures on an integrated circuit chip in accordance with the preferred embodiment.

Referring to FIG. 3, an example integrated circuit of a type to be used for implementing forward tracing to reduce pessimism in static timing of logic blocks laid out in parallel structures on an integrated circuit chip generally designated by the reference character 300 in accordance with the preferred embodiment. The integrated circuit 300 includes a Phase Locked Loop (PLL) 302 generating a clock, such as a 500 MHz clock, that is applied to a buffer (BUF) 304. A pair of dividers 306, 308, such as a divide by 2, and a divide by 1, receives the 500 MHz clock at an output of the buffer 304. The divide by 2 divider 306 provides an output 250 MHz clock indicated by dotted line and the divide by 1 divider 308 provides an output 500 MHz clock indicated by solid line, respectively applied to a first buffer 310, and a first buffer 312 and a second buffer 314, and a second buffer 316. Parallel 250 MHz and 500 MHz clock trees extend between respective pairs of buffers 318, and 320; 322, and 324, 326, and 328; and 330, and 332, respectively arranged in parallel structures in the example integrated circuit 300, and are applied to a pair of latches 334, 336 providing data indicated by a dashed line connected by data circuitry 338.

In accordance with features of the invention, the static timing tool 134, such as an EinsTimer static timing tool, uses labels to distinguish clock signals from one another. The labels connect particular clock signals with frequency and duty cycle information. The common path pessimism removal algorithm or program 136 and the forward tracing parallel clock tree proximity credit algorithm or program 138 of the invention takes advantage of the existing concept of clock labels and enhance the clock labels to carry additional information to allow reduction of pessimism due to default analysis of proximity effects. The extra information is attached to the clock labels, also called phases, on clock signals passing through potentially pessimism-introducing blocks, for example, attached to either block in a pair of closely-positioned blocks, to identify just which potentially pessimism-introducing block in the design the signal has passed through.

At the beginning of timing, an analysis is made to provide data for a table of proximity-related pessimism values at each potentially pessimism-introducing block and the amount of potential pessimism at each potentially pessimism-introducing block is associated by the table with the label for that potentially pessimism-introducing block. When full timing analysis is carried out, analysis of the labels on a pair of signals involved in a test allows identification of which potentially pessimism-introducing points affect the particular test. Reference to the pessimism values table using the labels identifies the quantity of pessimism that can be reasonably removed from the test for each potentially pessimism-introducing point affecting the test. The sum of all such pessimism values is the amount of credit appropriate to give the slack on the test.

In accordance with features of the invention, the method advantageously is implemented without complex tracing algorithms but rather with simple protocol to process pessimism values for all sinks-on-this-net with forward tracing and commands to ask for delays and to offset slack by specific amounts whenever two phases meet at a test. The method of the invention effectively eliminates some complexity, multiple decisions and time-consuming requirements of mechanisms that use backward path tracing from test points after propagation of arrival times are done.

Referring now to FIG. 4, there are shown exemplary steps for implementing forward tracing to reduce pessimism in static timing of logic blocks laid out in parallel structures on an integrated circuit chip in accordance with the preferred embodiment.

As indicated at a block 400, a user-provided list of pairs of clock tree buffers that are qualified by their layout position to give proximity credit to signals going through the pairs of clock tree buffers is read. A Repowering Unique Identified (RIU) is associated with each pair of guaranteed-closely-spaced repowering blocks as indicated at a block 402. As indicated at a block 404, next the RUI is associated for each pair with each repowering buffer instance in the pair. A set of user-supplied timing assertions sufficient to allow the static timer to drive all the clock repowering buffers as accurately as in full chip timing is read as indicated at a block 406.

Next timing the clock repowering trees is performed with sufficient detail to create accurate values of delay in each repowering buffer as indicated at a block 408. As indicated at a block 410, for each repowering buffer instance associated with an RUI, the amount of proximity penalty that is inherent in each of the repowering buffers is computed using a formula appropriate for the technology of the integrated circuit design.

For each RUI pair of repowering buffers, the smaller of the two calculated proximity values is selected and registered as the Proximity Penalty Value (PPV) for the respective RUI in a table of proximity-related pessimism value, as indicated at a block 412.

Figure 4B:
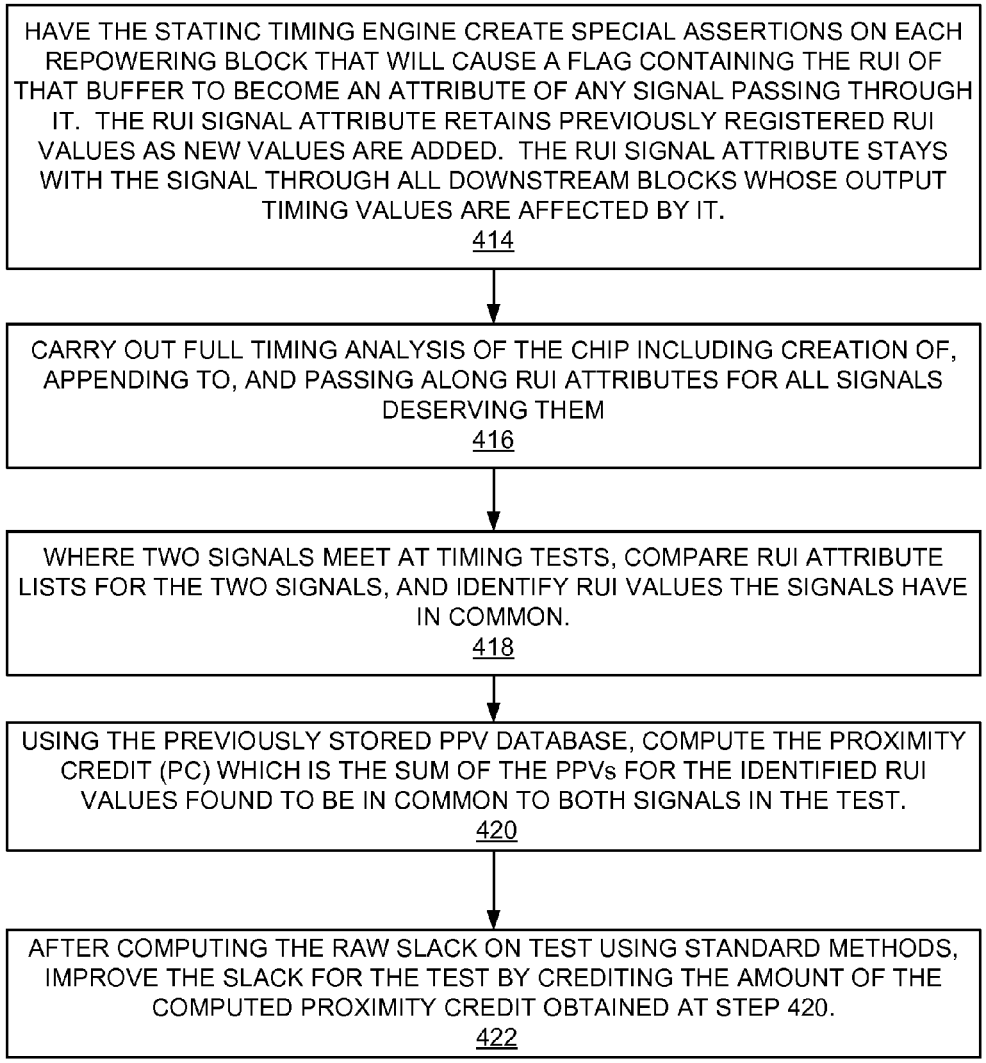

Referring to FIG. 4B, the forward tracing parallel clock tree proximity credit algorithm or program 138 of the preferred embodiment with the static timing analysis tool 134 creates special assertions on each repowering block that will cause a flag containing the RUI of that buffer to become an attribute on any signal passing through the repowering block as indicated at a block 414. The RUI signal attribute retains previously registered RUI values as new values are added. The RUI signal attribute stays with the signal through all downstream blocks whose output timing values are affected by it as shown at block 414.

Full timing analysis of the integrated circuit chip is carried out including creation of, appending to, and passing along RUI attributes for all signals deserving the RUI attributes as indicated at a block 416. Next where two signals meet at timing tests, the RUI attribute lists for the tow signals are compared, and the RUI values the signals have in common are identified as indicated at a block 418. Using the previously stored PPV database or table, the proximity credit (PC) is computed, which is the sum of the PPVs for the identified RUI values the signals have in common in the test as indicated at a block 420. As indicated at a block 422, after computing the raw slack on the test using standard methods, the slack for the test is improved by crediting the amount of the computed proximity credit (PC) obtained at the previous step at block 420. This effectively and efficiently reduces pessimism in the static timing of the logic blocks laid out in parallel structures in accordance with the preferred embodiment.

Figure 5:
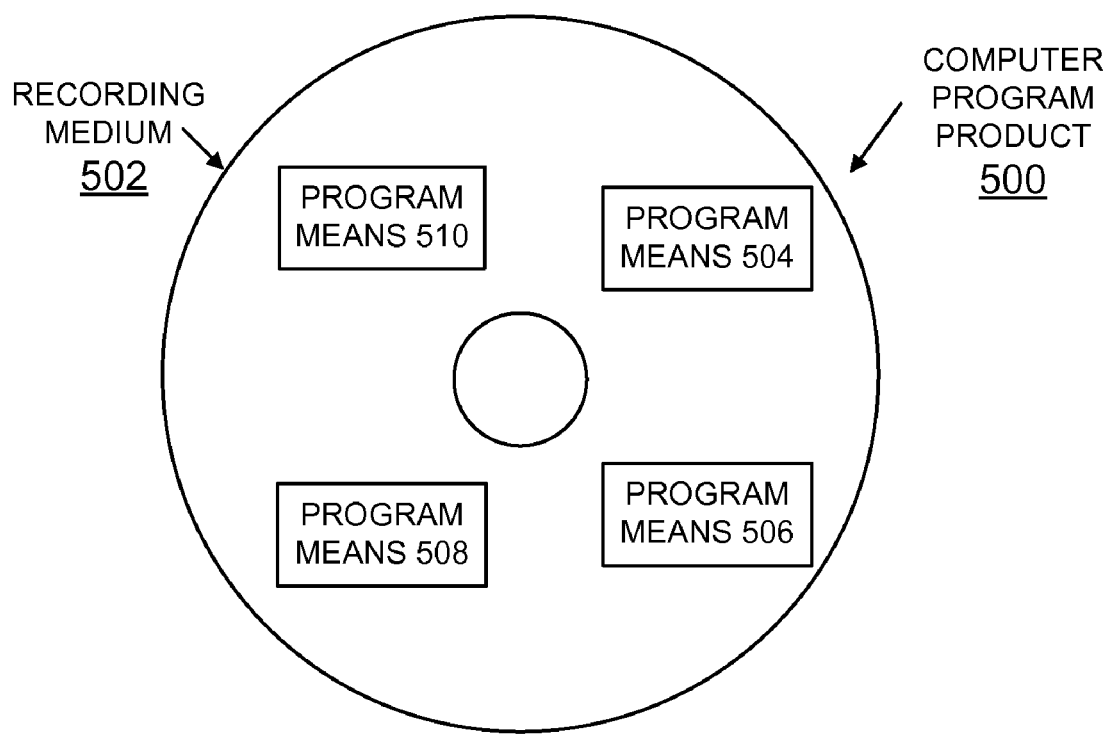
FIG. 5 is a block diagram illustrating a computer program product in accordance with the preferred embodiment.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, or another similar computer program product. Recording medium 502 stores program means 504, 506, 508, 510 on the medium 502 for carrying out the methods for implementing forward tracing to reduce timing pessimism in static timing of logic blocks laid out in parallel structures on an integrated circuit chip of the preferred embodiment in the system 100 of FIGS. 1 and 2.

A sequence of program instructions or a logical assembly of one or more interrelated modules defined by the recorded program means 504, 506, 508, 510, direct the computer system 100 for implementing forward tracing to reduce timing pessimism in static timing of logic blocks laid out in parallel structures on an integrated circuit chip of the preferred embodiment.

While the present invention has been described with reference to the details of the embodiments of the invention shown in the drawing, these details are not intended to limit the scope of the invention as claimed in the appended claims.

What is claimed is:

1. A computer-implemented method for implementing reduced pessimism in static timing of logic blocks laid out in parallel structures in an integrated circuit chip design comprising:
   using a common path pessimism removal algorithm, performing a forward tracing parallel clock tree proximity credit algorithm; and
   using forward tracing to identify closely-spaced logic blocks, and computing using a computer a proximity credit to reduce pessimism in the static timing test.

2. The computer-implemented method as recited in claim 1 wherein performing a forward tracing parallel clock tree proximity credit algorithm includes associating a Repowering Unique Identifier (RUI) with each pair of closely spaced logic blocks, said closely spaced logic blocks including an RUI pair of repowering buffers.

3. The computer-implemented method as recited in claim 2 includes performing an initial analysis to provide a proximity-related pessimism value (PPV) at each RUI pair of repowering buffers.

4. The computer-implemented method as recited in claim 3 includes performing timing analysis, and associating an RUI attribute to each test signal passing through an associated RUI logic block.

5. The computer-implemented method as recited in claim 4 includes performing analysis of labels on a pair of test signals, and comparing each said RUI attribute for said test signals and identifying common RUI attributes.

6. The computer-implemented method as recited in claim 5 wherein computing a proximity credit to reduce pessimism in the static timing test includes identifying said proximity credit by calculating a sum of proximity-related pessimism values (PPVs) for said identified common RUI attributes.

7. A system for implementing reduced pessimism in static timing of logic blocks laid out in parallel structures in an integrated circuit chip design comprising:
   a processor,
   a static timing tool tangibly embodied in a machine readable medium used in the integrated circuit design process, said static timing tool including a common path pessimism removal algorithm, and a forward tracing parallel clock tree proximity credit algorithm; and
   said processor using said common path tracing algorithm in said static timing tool, executing said forward tracing parallel clock tree proximity credit algorithm;
   said processor using forward tracing to identify closely-spaced logic blocks, and computing a proximity credit to reduce pessimism in the static timing test.

8. The system as recited in claim 7 wherein said processor performing a forward tracing parallel clock tree proximity credit algorithm includes said processor associating a Repowering Unique Identifier (RUI) with each pair of closely spaced logic blocks, said closely spaced logic blocks including an RUI pair of repowering buffers.

9. The system as recited in claim 8 includes said processor performing an initial analysis to provide a proximity-related pessimism value (PPV) at each RUI pair of repowering buffers.

10. The system as recited in claim 9 includes said processor performing timing analysis, and associating an RUI attribute to each test signal passing through an associated RUI logic block.

11. The system as recited in claim 10 includes said processor performing analysis of labels on a pair of test signals, and comparing each said RUI attribute for said test signals and identifying common RUI attributes.

12. The system as recited in claim 11 includes said processor computing a proximity credit to reduce pessimism in the static timing test includes said processor identifying said proximity credit by calculating a sum of proximity-related pessimism values (PPVs) for said identified common RUI attributes.

13. The system as recited in claim 7 wherein said processor using said common path tracing algorithm in said static timing tool, performing a forward tracing parallel clock tree proximity credit algorithm includes said processor receiving netlist data, said netlist data including physical placement data of integrated circuits, receiving timing rules, and receiving timing constraints.

14. A computer program product for implementing reduced pessimism in static timing of logic blocks laid out in parallel structures in an integrated circuit chip design in a computer system, said computer program product tangibly embodied in a non-transitory machine readable medium used in the integrated circuit design process, said static timing tool including a common path tracing algorithm, and a forward tracing parallel clock tree proximity credit algorithm, said computer program product including instructions executed by the computer system to cause the computer system to perform the steps of:

using a common path pessimism removal algorithm, performing a forward tracing parallel clock tree proximity credit algorithm; and using forward tracing to identify closely-spaced logic blocks, and computing a proximity credit to reduce pessimism in the static timing test.

15. The computer program product as recited in claim 14 wherein using a common path pessimism removal algorithm, performing a forward tracing parallel clock tree proximity credit algorithm includes receiving netlist data, said netlist data including physical placement data of integrated circuits, receiving timing rules, and receiving timing constraints.

16. The computer program product as recited in claim 14 wherein using a common path pessimism removal algorithm, performing a forward tracing parallel clock tree proximity credit algorithm includes associating a Repowering Unique Identifier (RUI) with each pair of closely spaced logic blocks, said closely spaced logic blocks including an RUI pair of repowering buffers.

17. The computer program product as recited in claim 16 includes performing an initial analysis to provide a proximity-related pessimism value (PPV) at each RUI pair of repowering buffers.

18. The computer program product as recited in claim 17 includes performing timing analysis, and associating an RUI attribute to each test signal passing through an associated RUI logic block.

19. The computer program product as recited in claim 18 includes performing analysis of labels on a pair of test signals, and comparing each said RUI attribute for said test signals and identifying common RUI attributes.

20. The computer program product as recited in claim 19 wherein computing a proximity credit to reduce pessimism in the static timing test includes identifying said proximity credit by calculating a sum of proximity-related pessimism values (PPVs) for said identified common RUI attributes.

* * * * *